(12) United States Patent
Al Jarri

(10) Patent No.: US 11,641,371 B2
(45) Date of Patent: May 2, 2023

(54) SYSTEMS, METHODS AND COMPUTER-READABLE MEDIA FOR MONITORING A COMPUTER NETWORK FOR THREATS USING OLAP CUBES

(71) Applicant: Saudi Arabian Oil Company, Dhahran (SA)

(72) Inventor: Johara Abdulrahman Al Jarri, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 143 days.

(21) Appl. No.: 17/177,410

(22) Filed: Feb. 17, 2021

(65) Prior Publication Data
US 2022/0263844 A1    Aug. 18, 2022

(51) Int. Cl.
*H04L 9/40*      (2022.01)
*G06F 16/22*     (2019.01)
(Continued)

(52) U.S. Cl.
CPC ...... *H04L 63/1425* (2013.01); *G06F 16/2264* (2019.01); *G06F 16/283* (2019.01);
(Continued)

(58) Field of Classification Search
CPC ..... H04L 63/1425; H04L 43/16; H04L 51/42; G06F 16/2264; G06F 16/283; G08B 5/22; G08B 21/182; H04W 4/14
See application file for complete search history.

(56) References Cited

U.S. PATENT DOCUMENTS 6,282,546 B1    8/2001  Gleichauf et al.
6,477,536 B1 *  11/2002  Pasumansky ......... G06F 16/283
                                                707/999.102
(Continued)

FOREIGN PATENT DOCUMENTS

CA    2952877 C  *  1/2021  ........... G06F 16/278
CN    105701200 A *  6/2016  ......... G06F 16/2264
(Continued)

OTHER PUBLICATIONS

Brahmi et al., "OMC-IDS: At the Cross-Roads of OLAP Mining and Intrusion Detection", Springer-Verlag Berlin Heidelberg, PAKDD, Part II, LNAI 7302, pp. 13-24, 2012.

*Primary Examiner* — Alina A Boutah
(74) *Attorney, Agent, or Firm* — Dinsmore & Shohl LLP

(57) ABSTRACT

Systems, methods, and computer-readable media for monitoring a computer network for threats using OLAP cubes are disclosed. In one embodiment, a method of monitoring a computer network for threats includes receiving, from a plurality of computing devices on the network, dataset data, asset data, and temporal data, and storing, in an online analytical processing cube for each computing device of the plurality of computing devices, the dataset data within a dataset dimension, the asset data within an asset dimension, and the temporal data within a temporal dimension. The method further includes searching one or more online analytical processing cubes for correlated data within two or more of the dataset dimension, the asset dimension, and the temporal dimension satisfying an alert metric, and issuing an alert when correlated data satisfies the alert metric.

18 Claims, 4 Drawing Sheets

(51) Int. Cl.
*G06F 16/28* (2019.01)
*G08B 21/18* (2006.01)
*H04L 43/16* (2022.01)
*G08B 5/22* (2006.01)
*H04W 4/14* (2009.01)
*H04L 51/42* (2022.01)

(52) U.S. Cl.
CPC ............ *G08B 5/22* (2013.01); *G08B 21/182* (2013.01); *H04L 43/16* (2013.01); *H04L 51/42* (2022.05); *H04W 4/14* (2013.01)

(56) References Cited

U.S. PATENT DOCUMENTS

| | | | |
|---|---|---|---|
| 7,003,476 B1 * | 2/2006 | Samra | G06Q 30/00 705/7.33 |
| 8,447,722 B1 * | 5/2013 | Ahuja | G06F 21/606 707/607 |
| 8,533,167 B1 * | 9/2013 | Ketkar | G06F 17/10 707/693 |
| 9,503,421 B2 | 11/2016 | Liang | |
| 9,646,072 B2 * | 5/2017 | Averbuch | G06F 16/283 |
| 9,692,785 B2 | 6/2017 | Stephan et al. | |
| 10,587,644 B1 | 3/2020 | Stolte et al. | |
| 2004/0039736 A1 * | 2/2004 | Kilmer | G06F 16/2452 |
| 2004/0215626 A1 * | 10/2004 | Colossi | G06F 16/22 |
| 2004/0249866 A1 * | 12/2004 | Chen | H04M 15/04 |
| 2006/0005121 A1 * | 1/2006 | Berger | G06F 16/283 715/230 |
| 2006/0026180 A1 * | 2/2006 | Kres | G06F 16/283 |
| 2006/0074741 A1 * | 4/2006 | Orumchian | G06F 16/254 707/999.1 |
| 2006/0218157 A1 * | 9/2006 | Sourov | G06F 16/283 |
| 2008/0196108 A1 * | 8/2008 | Dent | G06F 21/6245 726/28 |
| 2008/0201766 A1 * | 8/2008 | Amirov | G06F 21/6227 726/4 |
| 2010/0088341 A1 * | 4/2010 | Ah-Soon | G06F 21/6227 707/783 |
| 2011/0066457 A1 * | 3/2011 | Chang | G06Q 10/10 719/330 |
| 2012/0259758 A1 * | 10/2012 | Tunney | G06Q 40/04 705/37 |
| 2014/0067751 A1 * | 3/2014 | Ketkar | G06F 16/254 707/602 |
| 2014/0156588 A1 | 6/2014 | Mohanty et al. | |
| 2016/0103903 A1 * | 4/2016 | Vivalda | H04L 65/403 709/204 |
| 2017/0308603 A1 * | 10/2017 | Kulkarni | G06F 16/283 |
| 2018/0107705 A1 * | 4/2018 | Gitelman | G06F 16/254 |
| 2018/0152337 A1 * | 5/2018 | Bosh | H04L 43/50 |
| 2018/0285439 A1 * | 10/2018 | Li | G06F 16/2453 |
| 2019/0286636 A1 * | 9/2019 | Bedard | G06F 16/2465 |
| 2020/0293962 A1 * | 9/2020 | Herman | G06Q 10/0633 |

FOREIGN PATENT DOCUMENTS

| | | | | |
|---|---|---|---|---|
| CN | 109918285 A | | 6/2019 | |
| CN | 110119422 A | * | 8/2019 | ........... G06F 16/254 |
| CN | 110866259 A | | 3/2020 | |
| TW | I434190 B | | 4/2014 | |
| WO | WO-2008092147 A2 | * | 7/2008 | ............. G06Q 30/02 |
| WO | WO-2010040174 A1 | * | 4/2010 | ....... G06F 17/30578 |
| WO | 2019227238 A1 | | 12/2019 | |
| WO | WO-2019227238 A1 | * | 12/2019 | ......... G06F 16/2379 |

* cited by examiner

SYSTEMS, METHODS AND COMPUTER-READABLE MEDIA FOR MONITORING A COMPUTER NETWORK FOR THREATS USING OLAP CUBES

BACKGROUND

Cyber threats to computing networks are ever-increasing. Such cyber threats can cause significant financial losses, release of personal information to bad actors, release of confidential and proprietary information, damage to computing equipment among others, and/or the like. Because computing devices on computing networks generate vast amounts of data, it is very difficult to detect cyber threats. When cyber threats are detected, it is often too late and the damage has already been done. Data on computer networks that are collected are often from disparate sources, and cybersecurity personnel often do not have access to all types of data, such as application data or system data.

Accordingly, alternative systems and methods for monitoring a computer network for threats may be desired.

SUMMARY

Embodiments of the present disclosure are directed to systems, methods, and computer-readable media for monitoring a computer network for threats. More particularly, embodiments receive data from a plurality of computers, and store such data in one or more online analytical processing (OLAP) cubes. The OLAP cubes of the present disclosure alleviate big data handling and enable the correlation of disparate data types that are not frequently evaluated together for cybersecurity reasons. OLAP cubes are analyzed to determine if correlated data stored by the OLAP cubes satisfy one or more alert metrics. When correlated data does satisfy an alert metric, it is indicative of a cybersecurity threat and an alert is then issued to the appropriate personnel that can address the cybersecurity threat by taking appropriate action.

In one embodiment, a method of monitoring a computer network for threats includes receiving, from a plurality of computing devices on the network, dataset data, asset data, and temporal data, and storing, in an online analytical processing cube for each computing device of the plurality of computing devices, the dataset data within a dataset dimension, the asset data within an asset dimension, and the temporal data within a temporal dimension. The method further includes searching one or more online analytical processing cubes for correlated data within two or more of the dataset dimension, the asset dimension, and the temporal dimension satisfying an alert metric, and issuing an alert when correlated data satisfies the alert metric.

In another embodiment, a system of monitoring a computer network for threats includes one or more processors, and a non-tangible computer-readable medium storing computer-readable instructions. Execution of the computer-readable instructions by the one or more processors, causes the one or more processors to receive, from a plurality of computing devices on the network, dataset data, asset data, and temporal data, and store, in an online analytical processing cube for each computing device of the plurality of computing devices within the non-tangible computer readable medium, the dataset data within a dataset dimension, the asset data within an asset dimension, and the temporal data within a temporal dimension. Execution of the computer-readable instructions by the one or more processors further causes the one or more processors to search one or more online analytical processing cubes for correlated data within two or more of the dataset dimension, the asset dimension, and the temporal dimension satisfying an alert metric, and to issue an alert when correlated data satisfies the alert metric.

In yet another embodiment, a computer-readable medium stores instructions that, when executed by a computer, causes the computer to receive, from a plurality of computing devices on the network, dataset data, asset data, and temporal data, store, in an online analytical processing cube for each computing device of the plurality of computing devices within the non-tangible computer readable medium, the dataset data within a dataset dimension, the asset data within an asset dimension, and the temporal data within a temporal dimension, search one or more online analytical processing cubes for correlated data within two or more of the dataset dimension, the asset dimension, and the temporal dimension satisfying an alert metric, and issue an alert when correlated data satisfies the alert metric.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION OF THE DISCLOSURE

Figure 1:
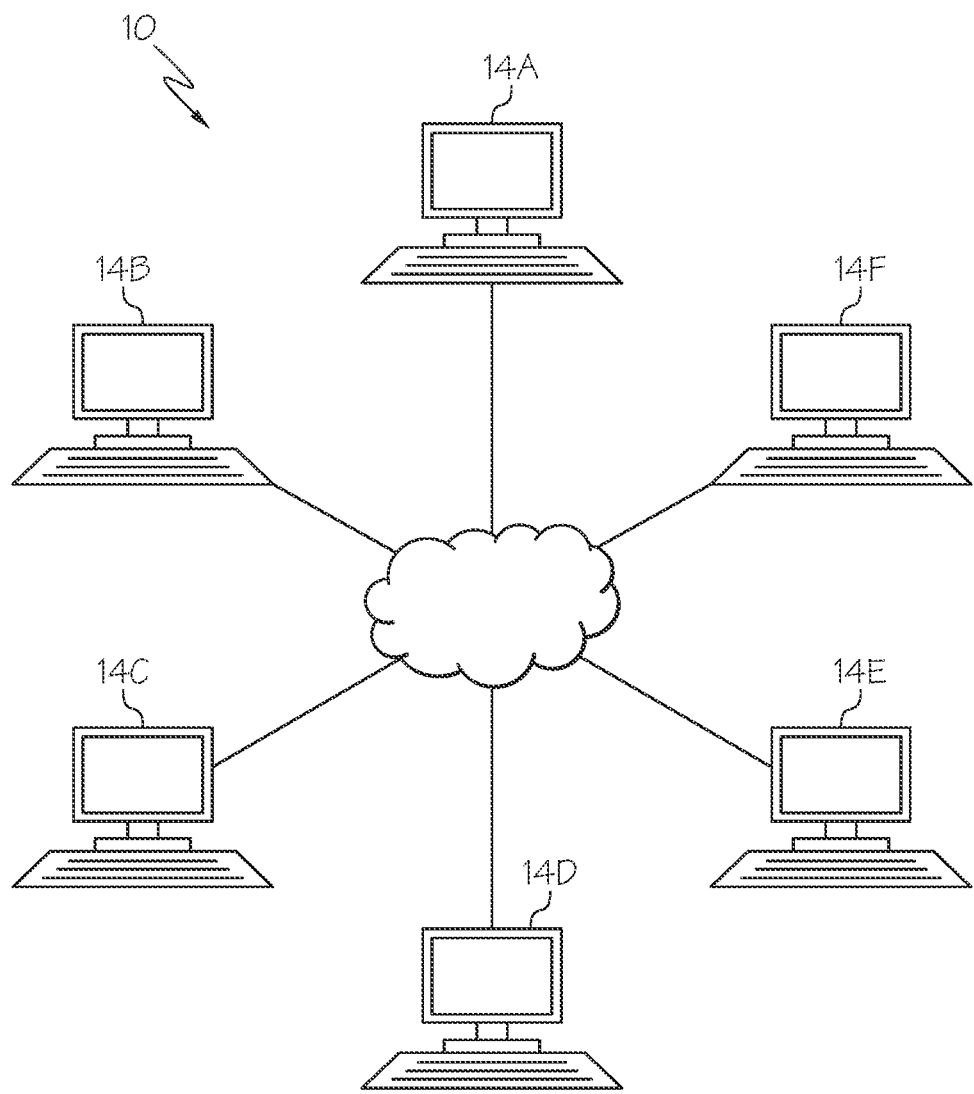
FIG. 1 illustrates an example computer network according to one or more embodiments described and illustrated herein.

Embodiments of the present disclosure are directed to systems, methods and computer-readable mediums for monitoring a computer network for threats. Referring to FIG. 1, an example computer network 10 is illustrated. The computer network comprises any number of computing devices 14A-14F that are networked together, thereby allowing the exchange of data between computers on the network 10. The computing devices 14A-14F may be any type of computing device such as, without limitation, a desktop computer, a laptop computer, a tablet computer, a smart phone, an e-reader device, a server, and a router. The computer network 10 may be any type of network, such as, without limitation, a local area network, a wide area network, a campus network, a metropolitan network, an enterprise network, and a global area network.

Cybersecurity is a practice of protecting computing devices and data on the computer network 10 from attack by bad actors. Attack events may take on a variety of forms, such as unauthorized access, downloading of private and/or proprietary information, denial-of-service attack, drive-by attack, man-in-the-middle attack, TCP SYN flood attack, botnet attacks, and the like. For example, one of the computing devices 14A-14F of the computer network 10 may attack the other computing devices 14A-14F. These attacks have an undesirable effect on the computing devices. Each type of attack may produce a data signature or fingerprint on the network 10. However, due to the voluminous data on the network 10, it may be very difficult for attacks to be detected early enough to prevent them from causing damage.

Additionally, data is commonly received, organized, and managed by different operators, such as operators of an enterprise network. A computer system generates different types of information about different events that have happened, such as information of raw files, logs, spreadsheet data, and the like. There are three main types of data generated by a computer: security, system and application. The combination of system and application data are usually referred to as operational data and the security data is referred to as cybersecurity data.

The security data collects security events on a system related to valid logins, invalid logins, and file manipulation (e.g., file deletion). The system data collects information about the system itself, such as a driver failing to start, processer utilization and memory usage. As for application data, it can include application errors, application starting with network port or database information, and the like.

Cybersecurity personnel may only monitor security-related data (e.g., login data, file deletion data, and the like), while other personnel may monitor non-security-related data such as application data (e.g., application errors, application starting data, application network port information, application database information and/or the like). Because application and other data is not correlated with security data, cybersecurity personnel may not have adequate vision to detect an attack event early enough to block it or otherwise prevent a damaging outcome.

In embodiments of the present disclosure, many types of data are stored together in a correlated manner so that the correlated data may be easily searched and analyzed for the detection of attack events. Correlation is a technique for exploring the relationship between two values or more. In embodiments, data correlation is leveraged to group certain events to investigate a cyber-risk or identify a misuse of resources. Embodiments make it easier for data signatures of attack events to be detected within the correlated data.

Figure 2:
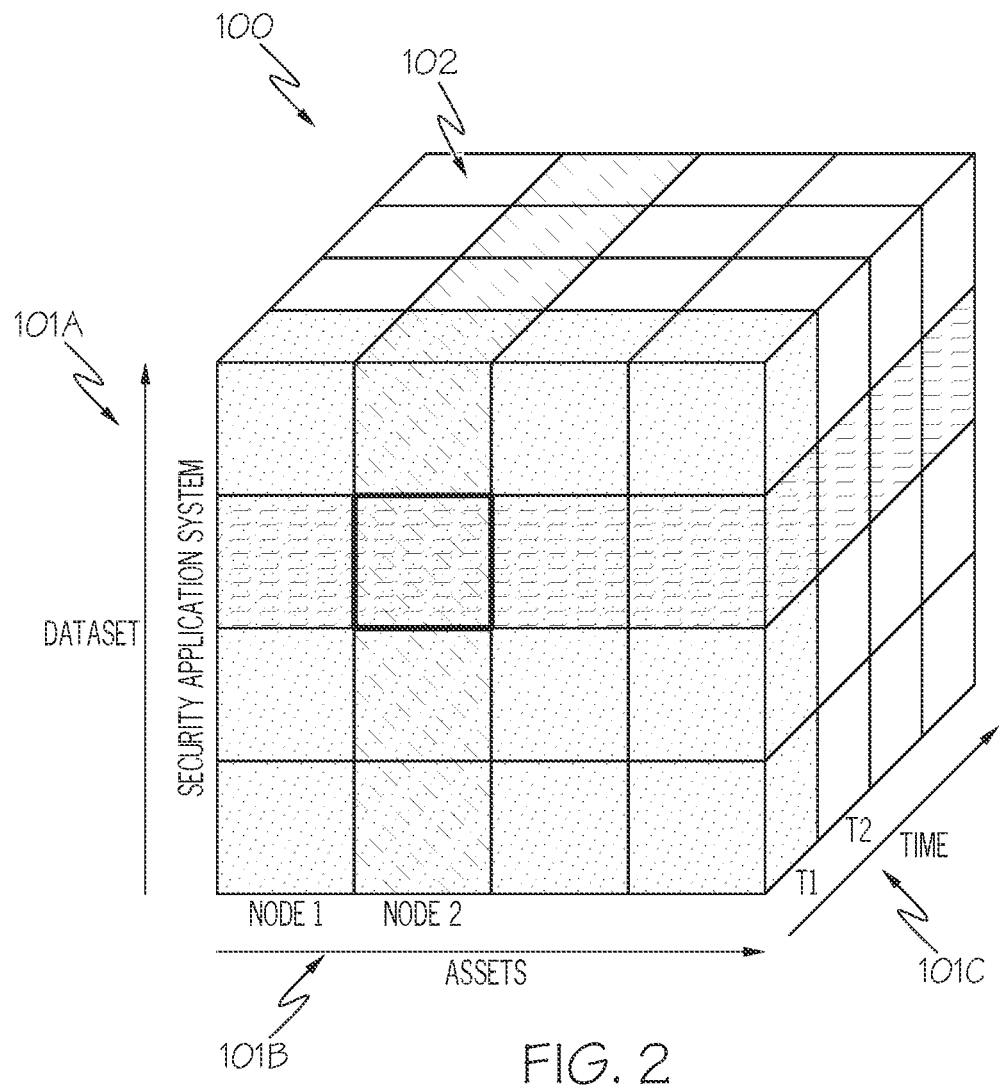
FIG. 2 illustrates an example online analytical processing (OLAP) cube according to one or more embodiments described and illustrated herein.

Referring now to FIG. 2, embodiments of the present disclosure store data of many different types in an online analytical processing (OLAP) cube 100. An OLAP cube 100 is a multi-dimensional array of data and a technique of analyzing and mining data to find information.

The dimensions of the example OLAP cube 100 are a dataset dimension 101A, an asset dimension 101B, and a temporal dimension 101C. Although the OLAP cube 100 of FIG. 2 is illustrated as having three dimensions, embodiments are not limited thereto. Cells 102 within the OLAP cube 100 provide correlated data defined by the three dimensions. As described in more detail below, the usage of the OLAP cube in cybersecurity event correlation may lead to faster information processing and may provide aggregated and detailed information. Cyber threat monitoring using the OLAP cube may thus lead to faster identification of risk or computer resource misuse. The multidimensional storage provided by the OLAP cube offers better visualization of information as well as providing a better way for planning, forecasting and reporting over traditional methods.

The dataset dimension 101A stores the three types of data described above: security data, system data, and application data. The assets dimension 101B stores information regarding the source of data (i.e., the source name of the computer sending information to the computing device). The temporal dimension 101C stores the data and time of events.

Figure 3:
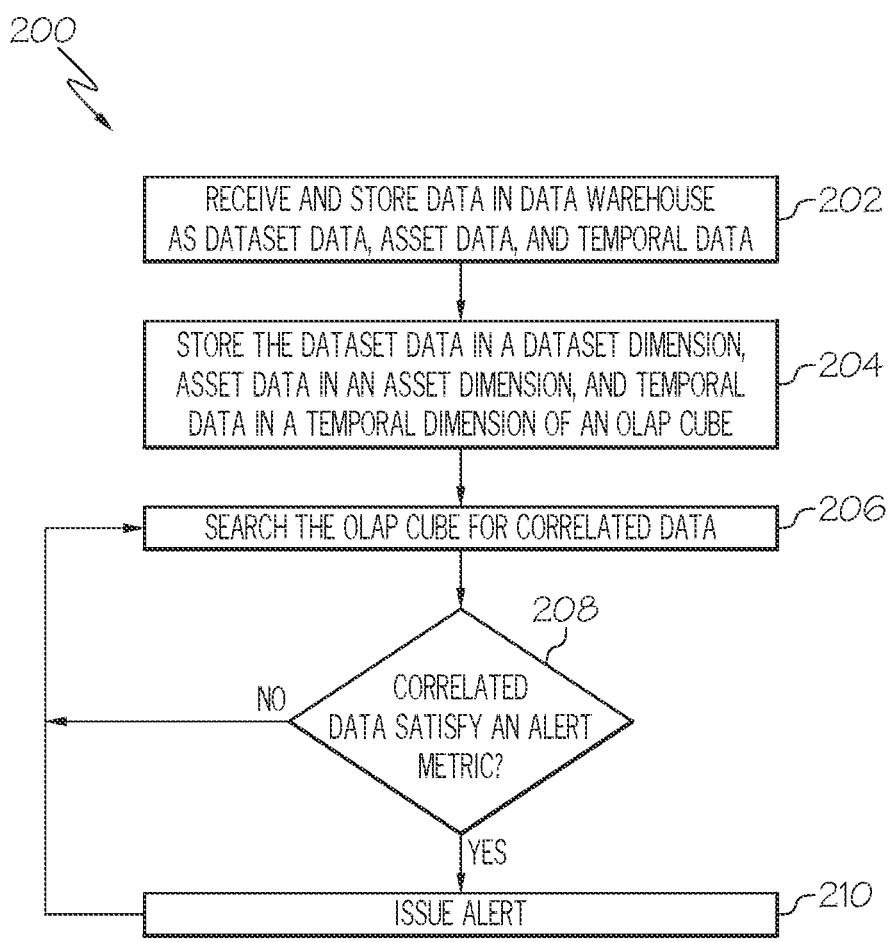
FIG. 3 illustrates an example method of monitoring a computer network for threats using an OLAP cube according to one or more embodiments described and illustrated herein.

FIG. 3 is a flowchart 200 graphically illustrating an example method for storing data in an OLAP cube 100 and for analyzing the OLAP cube 100 for attack events. At block 202, data from a plurality of computing devices is received and stored in a data warehouse. Data from many different computers may be stored in the data warehouse. The incoming data may be cleansed and labeled by the type of data (e.g., security data, application data, and system data). Data stored within the data warehouse are then stored in individual OLAP cubes 100 at block 204. In some embodiments, each computing device in the computer network is assigned an individual OLAP cube. In some embodiments, each of the OLAP cubes of a computing network are stored in a larger network OLAP cube.

Referring once again to FIG. 2, the dataset dimension 101A includes a security category, an application category, and a system category. The security category stores security data relating to security events (e.g., valid logins, invalid logins, file manipulation, object access, policy change, and/or the like). The application category stores application data (e.g., application errors, application starting with network port and/or database information, process started, and/or the like). The system category stores system data regarding the system itself (e.g., processor utilization, memory usage, driver failing to start, and/or the like).

Storing the computer data in an OLAP cube 100 enables the data to be correlated and to be quickly and efficiently searched for cybersecurity signatures. Referring once again to FIG. 3, at block 206 the OLAP cube is searched or otherwise analyzed (e.g., using OLAP queries and/or filters) for correlated data satisfying one or more alert metrics. More particularly, the method comprises searching the OLAP cube 100 for correlated data that is indicative of a known type of attack event (i.e., a cyber-attack). Types of attacks may produce different signatures or a fingerprint within the data. For example, if processor utilization is reaching unusual high levels and flagged by the system data, and the application data is showing that a multiple process threads are initiated at network port, than it is an indication of process injection and scanning of the network. In a non-limiting example, an OLAP filter may be configured as a signature or an indicator of a possible cyber-attack.

In some embodiments, each type of attack is defined by its own alert metric. At block 208 of FIG. 3, correlated data of the OLAP cube 100 is compared against one or more alert metrics. If correlated data is found within the OLAP cube 100 that satisfies an alert metric (e.g., satisfying a filter), an alert is issued at block 210 and the process returns to block 206 to continue to look for correlated data satisfying an alert metric. If no correlated data satisfying an alert metric is found at block 208, the process continues back to block 206 to continue to look for correlated data satisfying an alert metric.

Embodiments are not limited by specific requirements of the alert metric. As a non-limiting example, an alert metric may be designed to monitor processor utilization and activity at individual ports. Thus, this example alert metric may be defined by a processor utilization threshold and a network port threshold. The network port threshold may be defined by a number of process threads that are initiated at the network port. When the processor utilization stored within the OLAP cube is greater than the processor utilization threshold and the number of process threads initiated at a particular port is greater than the network port threshold at the same period of time, the alert metric may be issued.

As another example of an attack event and a corresponding alert metric, assume that Server1 has a user login at 3:00 AM as indicated by data within the security category of the datasets dimension of the OLAP cube. Further, at 3:30 AM the processor utilization of Server1 increases as indicated by the system data of the datasets dimension of the OLAP cube. OLAP cubes for Server2 and Server3 include application data showing multiple connection requests from Server1. In this example, the alert metric depends on data or events at different time periods. For example, an alert metric may be satisfied when the security data within the security category includes a first event at a first time period, the system data within the system dataset includes a second event at a second time period within a threshold time period of the first time period, and the application data within the application dataset includes a third event at a third time period within the threshold time period of the first time period. Any number of conditions may be set to define an alert metric.

Other alert metrics may include high memory utilization and program start like notepad that doesn't require high utilization.

The alert that is issued may take many forms. As a non-limiting example, the alert may be a graphic or text that is displayed within a graphical user interface of a software application, such as a software application used by cybersecurity personnel. Further non-limiting examples for the alert are text message (e.g., SMS message), an e-mail, an audio alert, and illumination of one or more lights. The alert puts cybersecurity personnel on notice of a potential cyber-attack event. The cybersecurity personnel may then take action to limit the impact of the attack event.

Figure 4:
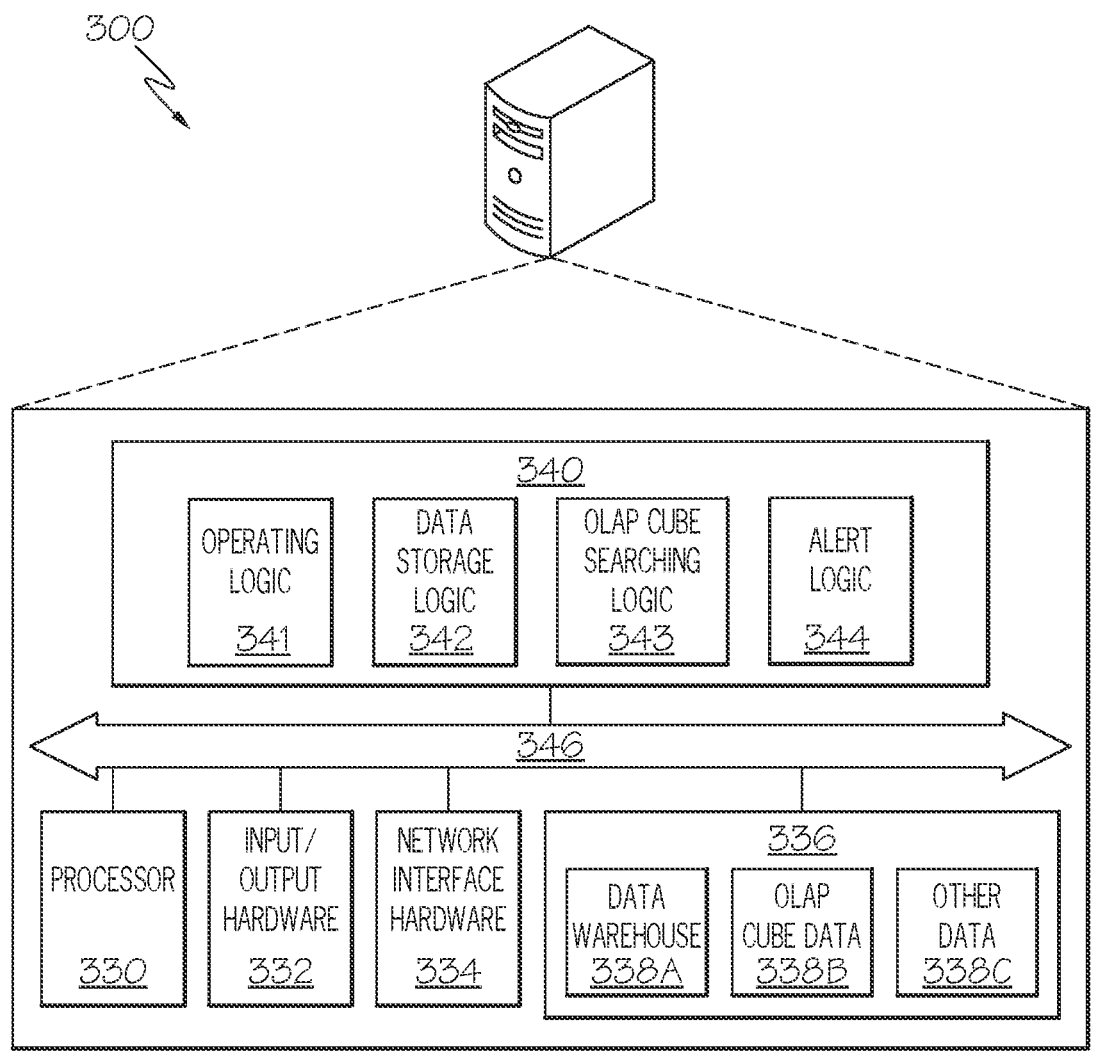
FIG. 4 illustrates an example computing system for monitoring a computer network for threats according to one or more embodiments described and illustrated herein.

Embodiments of the present disclosure may be implemented by a computing device, and may be embodied as computer-readable instructions stored on a non-transitory memory device. FIG. 4 depicts an example computing device 300 configured to perform the functionalities described herein. The example computing device 300 provides a system for monitoring a network for threats, and/or a non-transitory computer usable medium having computer readable program code for monitoring a network for threats embodied as hardware, software, and/or firmware, according to embodiments shown and described herein. While in some embodiments, the computing device 300 may be configured as a general purpose computer with the requisite hardware, software, and/or firmware, in some embodiments, the computing device 300 may be configured as a special purpose computer designed specifically for performing the functionality described herein. It should be understood that the software, hardware, and/or firmware components depicted in FIG. 4 may also be provided in other computing devices external to the computing device 300 (e.g., data storage devices, remote server computing devices, and the like).

As also illustrated in FIG. 4, the computing device 300 (or other additional computing devices) may include a processor 330, input/output hardware 332, network interface hardware 334, a data storage component 336 (which may store a data warehouse 338A, OLAP cube data 338B, and other data 338C (e.g., data defining alert metrics)), and a non-transitory memory component 340. The memory component 340 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 340 may be configured to store operating logic 341, data storage logic 342, OLAP cube searching logic 343, and alert logic 344 (each of which may be embodied as computer readable program code, firmware, or hardware, as an example). A local interface 346 is also included in FIG. 4 and may be implemented as a bus or other interface to facilitate communication among the components of the computing device 300.

The processor 330 may include any processing component configured to receive and execute computer readable code instructions (such as from the data storage component 336 and/or memory component 340). The input/output hardware 332 may include an electronic display device, keyboard, mouse, printer, camera, microphone, speaker, touchscreen, and/or other device for receiving, sending, and/or presenting data. The network interface hardware 334 may include any wired or wireless networking hardware, such as a modem, LAN port, wireless fidelity (Wi-Fi) card, WiMax card, mobile communications hardware, and/or other hardware for communicating with other networks and/or devices, such as to receive the data within the data warehouse 338A, the OLAP cube data 338B, and the other data 338C from various sources, for example.

It should be understood that the data storage component 336 may reside local to and/or remote from the computing device 300, and may be configured to store one or more pieces of data for access by the computing device 300 and/or other components. As illustrated in FIG. 4, the data storage component 336 may include data warehouse data, which may include data that is received from computing devices, and is cleaned and labeled. Similarly, the OLAP cube data 338B may be stored by the data storage component 336 and may include one or more OLAP cubes. Other data 338C used to perform the functionalities described herein may also be stored in the data storage component 336.

Included in the memory component 340 may be the operating logic 341, the data storage logic 342, the OLAP cube searching logic 343, and the alert logic 344. The operating logic 341 may include an operating system and/or other software for managing components of the computing device 300. Similarly, the data storage logic may reside in the memory component 340 and may include logic for receiving and storing computer-related data, such as storing the computer related data into the data warehouse and/or the OLAP cubes. The OLAP cube searching logic 343 includes logic for searching and analyzing the OLAP cubes for correlated data satisfying one or more alert metrics as described herein. The alert logic 344 is configured for receiving a request to issue an alert when an alert metric is satisfied, and effectuating the issuance of such an alert.

It should now be understood that embodiments of the present disclosure are directed to systems and methods for detecting threats to computing devices on a computer network. Cyber threats are a serious concern for the technical field of network computing. Embodiments store different types of computer-related data in one or more OLAP cubes having several dimensions. The OLAP cubes allow data of different types to be correlated and compared against one or more alert metrics that are indicative of one or more threats (i.e., one or more attack events). The OLAP cubes further allow quick and efficient searching of the computer-related data to find the relevant correlated data. Alerts are issued to cybersecurity personnel when the correlated data within one or more OLAP cubes satisfies one or more alert metrics.

The storage of the computer data in an OLAP cube provides many benefits with respect to cybersecurity. For example, embodiments alleviate big data handling and add value to the data monitoring process for cyber-attack detection. The OLAP cubes of the present disclosure allow for high-speed navigation through voluminous data and processing of such information for cyber-attack detection, thus reducing the computer processing time to analyze computer data for cyber threats. Further, embodiments reduce the complexity of the analysis performed, which speeds up results as the data is already formatted and categorized. The multidimensional data representation allows cybersecurity personnel to see information from different points of view.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A method of monitoring a computer network for threats, the method comprising:
   receiving, from a plurality of computing devices on the network, dataset data, asset data, and temporal data;
   storing, in an online analytical processing cube for each computing device of the plurality of computing devices, the dataset data within a dataset dimension, the asset data within an asset dimension, and the temporal data within a temporal dimension;
   searching one or more online analytical processing cubes for correlated data within two or more of the dataset dimension, the asset dimension, and the temporal dimension satisfying an alert metric; and
   issuing an alert when correlated data satisfies the alert metric, wherein:
   the alert metric comprises a processor utilization threshold and a network port threshold; and
   the alert metric is satisfied when the system data within the system dataset comprises a processor utilization that is greater than the processor utilization threshold and the application data within the application dataset comprises a number of threads initiated at a network port is greater than the network port threshold.

2. The method of claim 1, wherein the alert is one of a message displayed in a software application, an SMS message, and an e-mail.

3. The method of claim 1, wherein the dataset dimension comprises a security category, an application category, and a system category.

4. The method of claim 3, wherein the security category stores security data, the application category stores application data, and the system category stores system data.

5. The method of claim 4, wherein:
   the security data comprises one or more of login information and file manipulations;
   the application data comprises one or more of application errors, application network port information, and application database information; and
   the system data comprises one or more of processor utilization, memory usage, and driver failures.

6. The method of claim 3, wherein the alert metric is satisfied when the security data within the security category includes a first event at a first time period, the system data within the system dataset includes a second event at a second time period within a threshold time period of the first time period, and the application data within the application dataset includes a third event at a third time period within the threshold time period of the first time period.

7. The method of claim 1, wherein the asset data comprises a source name corresponding to a source of information, and the temporal data comprises a date and a time of an event stored in the online analytical processing cube.

8. A system of monitoring a computer network for threats, the system comprising:
   one or more processors; and
   a non-transitory computer-readable medium storing computer-readable instructions that, when executed by the one or more processors, causes the one or more processors to: receive, from a plurality of computing devices on the network, dataset data, asset data, and temporal data; store, in an online analytical processing cube for each computing device of the plurality of computing devices within the non-tangible computer readable medium, the dataset data within a dataset dimension, the asset data within an asset dimension, and the temporal data within a temporal dimension; search one or more online analytical processing cubes for correlated data within two or more of the dataset dimension, the asset dimension, and the temporal dimension satisfying an alert metric; and issue an alert when correlated data satisfies the alert metric, wherein:
   the alert metric comprises a processor utilization threshold and a network port threshold; and the alert metric is satisfied when the system data within the system dataset comprises a processor utilization that is greater than the processor utilization threshold and the application data within the application dataset comprises a number of threads initiated at a network port is greater than the network port threshold.

9. The system of claim 8, wherein the alert is one of a message displayed in a software application, an SMS message, and an e-mail.

10. The system of claim 8, wherein the dataset dimension comprises a security category, an application category, and a system category.

11. The system of claim 10, wherein the security category stores security data, the application category stores application data, and the system category stores system data.

12. The system of claim 11, wherein:
   the security data comprises one or more of login information and file manipulations;
   the application data comprises one or more of application errors, application network port information, and application database information; and
   the system data comprises one or more of processor utilization, memory usage, and driver failures.

13. The system of claim 10, wherein the alert metric is satisfied when the security data within the security category includes a first event at a first time period, the system data within the system dataset includes a second event at a second time period within a threshold time period of the first time period, and the application data within the application dataset includes a third event at a third time period within the threshold time period of the first time period.

14. The system of claim 8, wherein the asset data comprises a source name corresponding to a source of information, and the temporal data comprises a date and a time of an event stored in the online analytical processing cube.

15. A non-transitory computer-readable medium storing instructions that, when executed by a computer, causes the computer to:
- receive, from a plurality of computing devices on the network, dataset data, asset data, and temporal data;
- store, in an online analytical processing cube for each computing device of the plurality of computing devices within the non-tangible computer readable medium, the dataset data within a dataset dimension, the asset data within an asset dimension, and the temporal data within a temporal dimension;
- search one or more online analytical processing cubes for correlated data within two or more of the dataset dimension, the asset dimension, and the temporal dimension satisfying an alert metric; and
- issue an alert when correlated data satisfies the alert metric, wherein:
- the alert metric comprises a processor utilization threshold and a network port threshold; and
- the alert metric is satisfied when the system data within the system dataset comprises a processor utilization that is greater than the processor utilization threshold and the application data within the application dataset comprises a number of threads initiated at a network port is greater than the network port threshold.

16. The computer-readable medium of claim 15, wherein:
- the dataset dimension comprises a security category, an application category, and a system category; and
- the security category stores security data, the application category stores application data, and the system category stores system data.

17. The computer-readable medium of claim 16, wherein:
- the security data comprises one or more of login information and file manipulations;
- the application data comprises one or more of application errors, application network port information, and application database information; and
- the system data comprises one or more of processor utilization, memory usage, and driver failures.

18. The computer-readable medium of claim 16, wherein the alert metric is satisfied when the security data within the security category includes a first event at a first time period, the system data within the system dataset includes a second event at a second time period within a threshold time period of the first time period, and the application data within the application dataset includes a third event at a third time period within the threshold time period of the first time period.

* * * * *